United States Patent
Ise et al.

(10) Patent No.: US 6,994,114 B2
(45) Date of Patent: Feb. 7, 2006

(54) PRESSURE CONTROL VALVE

(75) Inventors: Sadatake Ise, Tokyo (JP); Masaki Tomaru, Tokyo (JP); Hiroshi Kainuma, Tokyo (JP); Yoshitaka Tomatsu, Kariya (JP); Masayuki Takeuchi, Kariya (JP)

(73) Assignees: Fujikoki Corporation, Tokyo (JP); Denso Corporation, Aichi (JP)

( * ) Notice: Subject to any disclaimer, the term of this patent is extended or adjusted under 35 U.S.C. 154(b) by 0 days.

(21) Appl. No.: 10/372,148

(22) Filed: Feb. 25, 2003

(65) Prior Publication Data

US 2003/0168108 A1 Sep. 11, 2003

(30) Foreign Application Priority Data

Mar. 6, 2002 (JP) .............................. 2002-060944

(51) Int. Cl.
*G05D 16/06* (2006.01)

(52) U.S. Cl. .................................. 137/614.2
(58) Field of Classification Search ............. 137/614.2; 251/331
See application file for complete search history.

(56) References Cited

U.S. PATENT DOCUMENTS 4,630,642 A * 12/1986 Detweiler ................ 137/614.2
4,852,364 A    8/1989 Seener et al.
5,251,459 A   10/1993 Grass et al.
5,301,504 A *  4/1994 Bertling et al. .......... 137/614.2
5,960,818 A * 10/1999 Hecking ................... 137/614.2

FOREIGN PATENT DOCUMENTS

| JP | 2000-81157 A1 | 3/2000 |
| JP | 2000-230650 A1 | 8/2000 |
| JP | 2001-082835 A1 | 3/2001 |

OTHER PUBLICATIONS

European Search Report dated Apr. 28, 2003.

* cited by examiner

*Primary Examiner*—Kevin Lee
(74) *Attorney, Agent, or Firm*—Rader, Fishman & Grauer PLLC

(57) ABSTRACT

A pressure control valve, which has a main valve for control, capable of opening and closing a valve hole by means of a diaphragm, and controls the pressure of a fluid by the agency of the main valve for control, comprises a non-return auxiliary valve located around the main valve for control so as to be coaxial therewith. The non-return auxiliary valve includes a cylindrical portion to be guided by a valve guard body having the valve hole therein and an annular rib extending outward from one end of the cylindrical portion. The rib can engage an auxiliary-valve seat on an outlet-side case.

6 Claims, 3 Drawing Sheets

PRESSURE CONTROL VALVE

BACKGROUND OF THE INVENTION

1. Field of the Invention

The present invention relates to a pressure control valve, and more specifically, to a pressure control valve in the form of a composite valve that includes a check valve incorporated in a valving element of the pressure control valve.

2. Description of the Prior Art

Conventionally, pressure control valves are frequently used in a refrigerating cycle of the vapor-pressure compression type. In a pressure control valve described in Japanese Patent Application Laid-open No. 2000-230650, for example, a coil spring that applies a force to enlarge the opening of a valve port to a valving element is formed of a shape-memory alloy. In this case, the valve opening can be restrained from becoming smaller than a given value, and the refrigerant pressure on the outlet side of a radiator can be prevented from increasing excessively. Thus, apparatuses that are located on the high-pressure side of the radiator and a supercritical refrigerating cycle of a compressor can be prevented from being damaged.

In a pressure control valve described in Japanese Patent Application Laid-open No. 2000-81157, a temperature sensor of a control valve body is situated in a first refrigerant passage that connects the outlet side of a radiator and the inlet side of an internal heat exchanger, and a second refrigerant passage that guides a refrigerant flowing out of the heat exchanger to the upper-stream side is formed in a casing body. Thus, a delay of temperature change in a closed space (control chamber) behind the refrigerant temperature change on the outlet side of the radiator can be lessened, so that the temperature response of the pressure control valve can be improved.

In a pressure control valve described in Japanese Patent Application Laid-open No. 2001-82835, a noncondensable gas and a refrigerant with given density are sealed into a closed space in order to lessen fatigue breakage of a joint between a diaphragm and a valving element. The diaphragm is displaced by the difference between the internal pressure of the closed space and the refrigerant pressure on the outlet side of a radiator through all the area from a supercritical area to a condensation area. By doing this, stress can be prevented from being concentrated on the joint between the diaphragm and the valving element.

In general, according to these conventional pressure control valves, check valves are frequently used in a refrigeration system. For ease of installation of the refrigeration system, it is to be desired that various valves including pressure control valves should be readily installed even in a narrow space. In view of the durability or maintenance of the pressure control valves or manufacturing costs, moreover, the valves should preferably be simple in construction.

OBJECT AND SUMMARY OF THE INVENTION

The present invention has been contrived in order to solve the problems of the prior art, and its object is to propose a technique for a pressure control valve that incorporates a check valve. More specifically, the object of the invention is to provide a pressure control valve, in which a check valve is incorporated so that the pressure control valve or the check valve can be used alternatively, and which can be suitably used in a narrow space and is easy to manufacture and highly maintainable.

In order to achieve the above object, a pressure control valve according to the present invention has a main valve for control, capable of opening and closing a valve hole by means of a diaphragm, and controls the pressure of a fluid by the agency of the main valve for control. The valve comprises a non-return auxiliary valve located on the extension of the main valve for control in the direction of operation thereof or located around the main valve for control so as to be coaxial therewith.

The invention may be arranged in the following manner.

The non-return auxiliary valve includes a cylindrical portion to be guided by a valve guard body having the valve hole therein and an annular rib extending outward from one end of the cylindrical portion.

The rib can engage an auxiliary-valve seat on an outlet-side case having therein a spring chamber for a main valve-closing spring.

The outlet-side case is formed having a plurality of auxiliary-valve working holes opening in the auxiliary-valve seat and communicating with the spring chamber for the main valve-closing spring.

A bleed port is formed in the rib or between the spring chamber and a refrigerant inlet in an inlet-side case.

Constructed in this manner, the pressure control valve of the invention has the following effects.

The pressure control valve can be reduced in general size. More specifically, the non-return auxiliary valve and an auxiliary valve spring are arranged around the main valve for control so as to be coaxial therewith, so that no housing is needed to hold the auxiliary valve. Thus, the pressure control valve can be reduced in size and weight, and its manufacturing cost can be lowered.

The auxiliary-valve seat of the non-return auxiliary valve must only be formed on the upper surface of the outlet-side case in the shape of a ring that surrounds the valve guard body. Thus, the valve seat can be worked easily, so that its cost can be lowered.

Since a receiving frame and the valve guard body are formed integrally, moreover, the number of indispensable parts can be reduced, and there are no dimensional errors that are attributable to combination. Thus, a high-accuracy, high-reliability pressure control valve can be provided.

Metal seals are used for sealing between a temperature sensor lid and an inner seal portion of the inlet-side case and between the valve guard body and an inner seal portion of the outlet-side case. Further, screw clamping torque with which the inlet-side case and the outlet-side case are screwed to each other is converted into abutting load on each metal seal, whereby the metal seal surface is fixed. Thus, the temperature sensor lid need not be provided with any O-ring groove or O-ring. Furthermore, the valve guard body and the outlet-side case need not be threaded for connection, so that the cost can be lowered.

Further, the inlet-side case and the outlet-side case are sealed in a manner such that the respective outer peripheries of their screwed portions are grooved and welded together after they are screwed to each other. Thus, the O-rings and their corresponding grooves can be omitted, so that the cost can be lowered. Since welding is used for external sealing, moreover, a leakage to the outside can be reduced to zero.

Since the bleed port is formed in the outlet-side case or the non-return auxiliary valve, furthermore, it can be worked with ease. In some conventional pressure control valves, a bleed port is formed in a portion corresponding to a valve guard body. In this case, however, much air flows out through the bleed port during air setting operation, so that the setting operation takes time. If the bleed port is formed in the outlet-side case, as in the present invention, however, the air setting operation can be adjusted with use of a dedicated jig for an internal assembly (assembly of the temperature sensor lid, valve guard body, diaphragm, main valve for control, etc.) only, so that the operation can be performed speedily or efficiently without any outflow from the bleed port.

DETAILED DESCRIPTION OF THE PREFERRED EMBODIMENTS

Figure 1:
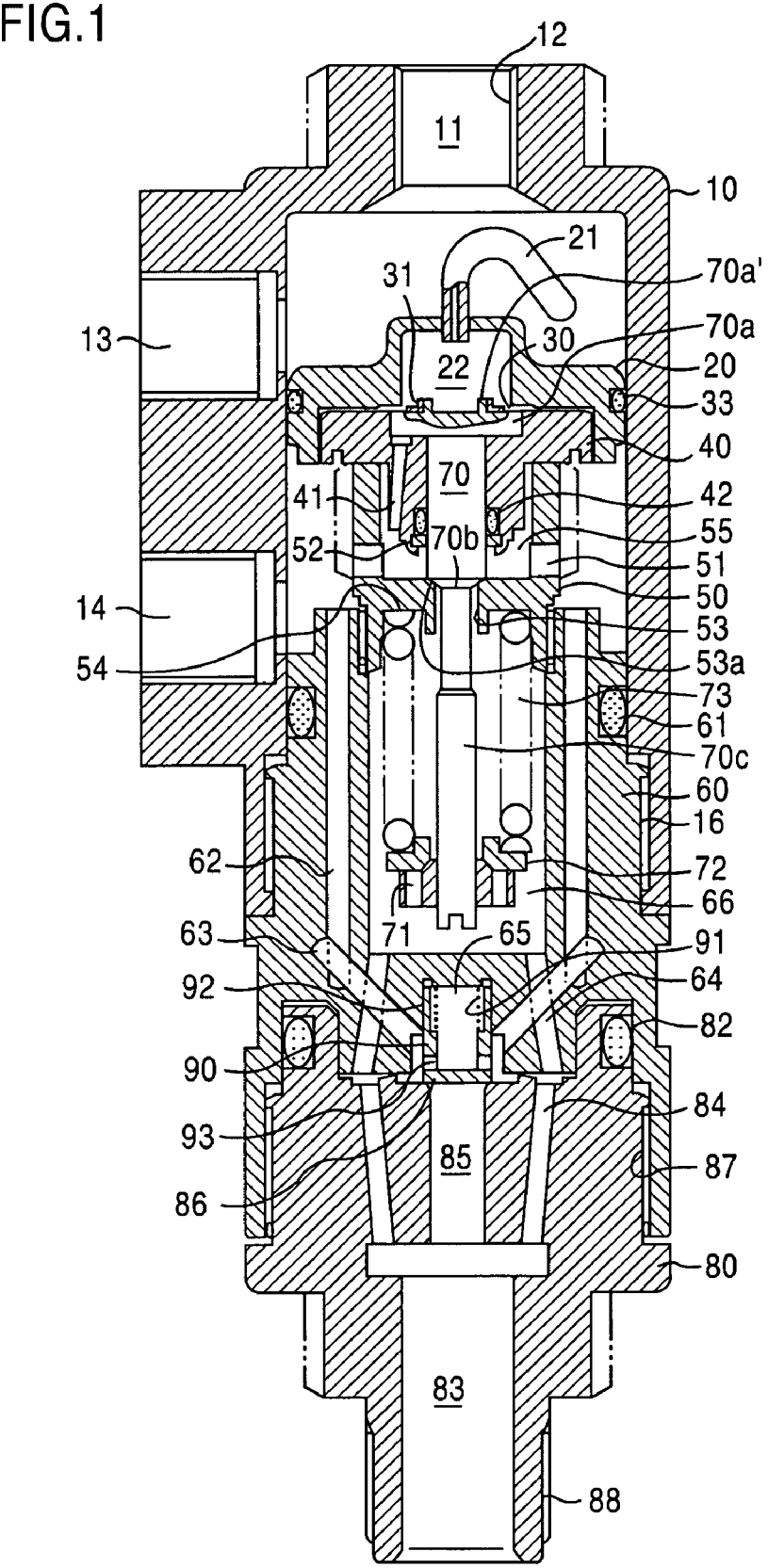
FIG. 1 is a longitudinal sectional view of a pressure control valve according to a first embodiment of the present invention.

A pressure control valve according to a first embodiment of the present invention will first be described with reference to FIG. 1.

This pressure control valve comprises an inlet-side case 10, a housing 60, and an outlet-side case 80, which constitutes an outside frame. The following is a description of various components of the pressure control valve with the inlet- and outlet-side cases 10 and 80 located above and below, respectively.

The inlet-side case 10, which is situated at the top portion of the pressure control valve, has a substantially cylindrical shape as a whole, and a first inlet 11 is formed in the upper part of the case 10. An internal thread portion 12 for connection to a conduit (not shown) of a refrigeration system is formed on the inner peripheral portion of the first inlet. Further, an outlet 13 and a second inlet 14 are formed in the flank of the inlet-side case 10. An inlet and an outlet of a heat exchanger (not shown) in the refrigeration system, for example, are coupled to the outlet 13 and the second inlet 14, respectively. Further, an internal thread portion 16 for connection to a housing 60 (mentioned later) is formed on the inner periphery of the lower end portion of the inlet-side case 10.

Below the outlet 13, a temperature sensor lid 20 is attached to the inner wall of the inlet-side case 10 through an O-ring 33. A capillary tube 21 and a main valve 70 for control are attached to the top and bottom, respectively, of the sensor lid 20. A diaphragm 30 and a reinforcing plate 31 are embedded in a ring-shaped protrusion 70a' on a main valve head portion 70a of the main valve 70. The valve 70 is formed having these members welded together.

A ring-shaped receiving frame 40 underlies the main valve head portion 70a. The temperature sensor lid 20, a peripheral pendent end portion of the diaphragm 30 that is welded together with the valve head portion 70a, and the receiving frame 40 are welded to form a closed space 22. Carbon dioxide is sealed in the space 22.

The main valve 70 for control is passed for vertical movement through the central portion of the lower part of the receiving frame 40 with the aid of an O-ring 42. The O-ring 42 is fixed to the frame 40 by caulking the lower end of the receiving frame 40 with a washer 52. Further, the receiving frame 40 is formed having an introduction hole 41 that causes a fluid pressure in a main valve chamber 55 to act on a pressure receiving surface at the lower part of the diaphragm 30. Suitable gaps are defined individually between the receiving frame 40 and the diaphragm 30, between the frame 40 and the main valve head portion 70a, and between the diaphragm 30 and the temperature sensor lid 20.

A valve guard body 50 is attached to the lower part of the receiving frame 40. The valve guard body 50 is substantially in the shape of a cup, and has a valve hole 53 in its base portion through which the main valve 70 for control passes. A plurality of passage holes 51 are formed in the peripheral wall of the flank of the valve guard body 50. Further, a valve seat 53a is formed at the inlet of the valve hole 53. Further, a spring bearing portion 54 of a main valve-closing spring 73 (mentioned later) is formed on the lower surface of the base portion of the valve guard body 50.

The main valve 70 for control has the shape of a column as a whole and comprises the main valve head portion 70a provided with the diaphragm 30, a valve portion 70b that engages the valve seat 53a of the valve guard body 50 for valve operation, and a valve column portion 70c. An adjust screw 71 is attached to the lower part of the valve column portion 70c. The screw 71 is provided with a spring bearing 72. The main valve-closing spring 73 is located between the spring bearing 72 and the spring bearing portion 54 of the valve guard body 50. The spring 73 serves to press the main valve 70 downward, thereby causing the valve portion 70b to engage the valve seat 53a (or to close the valve hole 53).

The housing 60 is coupled to the lower part of the inlet-side case 10 with an O-ring 61 between them. The temperature sensor lid 20, diaphragm 30, receiving frame 40, main valve 70 for control, and valve guard body 50 are arranged in a space that is defined by the inlet-side case 10 and the housing 60. The upper part of the housing 60 forms a spring chamber 66 for the main valve-closing spring 73. The outlet-side case 80 (mentioned later) is coupled to the lower part of the housing 60 with an O-ring 82 between them.

A regular passage 64 is formed in the base portion of the housing 60 so as to connect the spring chamber 66 and a regular passage 84 of the outlet-side case 80. A circular hole 65 for auxiliary valve is formed having a given depth in the center of the base portion of the housing 60. First and second non-return passages 62 and 63 that connect the auxiliary-valve hole 65 and the second inlet 14 are formed in the lateral portion and base portion, respectively, of the housing 60.

A non-return auxiliary valve 90 (mentioned later) is attached to the auxiliary-valve hole 65 in the housing 60. A thread portion 87 is formed on the outer periphery of the upper part of the outlet-side case 80 that is coupled to the lower part of the housing 60, and a thread portion 88 for conduit attachment on the lower part. The regular passage 84 that communicates with the regular passage 64 is formed in the upper part of the outlet-side case 80. An auxiliary-valve working hole 85 is formed in the center of the upper part of the outlet-side case 80. The upper end portion of the working hole 85 forms a valve seat 86 for auxiliary valve. Further, a main passage 83 that communicates with the regular passage 84 and the auxiliary-valve working hole 85 is formed in the center of the lower part of the outlet-side case 80.

The non-return auxiliary valve 90 is fitted in the auxiliary-valve hole 65 on the extension of the main valve 70 for control in the direction of its operation. As shown in FIG. 1, the auxiliary valve 90 has the shape of a cylindrical cup. When its base portion is pressed to engage the auxiliary-valve seat 86 by means of an auxiliary valve spring 91 and the pressure of a fluid from the second inlet 14, the fluid cannot pass through the non-return auxiliary valve 90, so that it never flows. A communication hole 93 is bored through the sidewall of the non-return auxiliary valve 90.

The following is a description of the operation of the first embodiment. The operation of a temperature sensor will be described first. A fluid that is introduced into the pressure control valve through the first inlet 11 flows out through the outlet 13. As this is done, carbon dioxide that is sealed in the closed space 22 is expanded or contracted depending on the temperature of the fluid introduced through the first inlet 11, and causes the diaphragm 30 to press the main valve 70 for control downward. In other words, if carbon dioxide in the closed space 22 is expanded depending on the temperature of the fluid, the main valve 70 is moved downward depending on the degree of the expansion, thereby closing the valve hole 53.

When the valve portion 70b is not in engagement with the valve seat 53a (i.e., when the valve hole 53 is open), the fluid that is introduced into the main valve chamber 55 through the second inlet 14 gets into the spring chamber 66 through the valve hole 53. Then, the fluid flows out from the regular passages 64 and 84 and the main passage 83. As this is done, the valve hole 53 is opened and closed for pressure control by means of the valve portion 70b of the main valve 70 for control. Thus, the fluid that flows into the first inlet 11 is a fluid that is pressure-controlled according to the fluid temperature.

Some of the fluid that is introduced through the second inlet 14 enters the first non-return passage 62, and then gets into the auxiliary-valve hole 65 through the second non-return passage 63 and the communication hole 93, thereby causing the non-return auxiliary valve 90 to close.

If the flow of the fluid is then changed so that the fluid flows back from the outlet-side case 80 toward the second inlet 14, the fluid that ascends in the auxiliary-valve working hole 85 pushes the non-return auxiliary valve 90 open by means of its pressure, and passes through the second non-return passage 63. Then, the fluid passes through the first non-return passage 62 and flows out through the second inlet 14. As this is done, the valve portion 70b of the main valve 70 for control is closed by means of the main valve-closing spring 73, so that the fluid never flows forward in the valve hole 53.

According to the first embodiment, the non-return auxiliary valve 90 is located right under the main valve 70 for control, so that the housing 60 is needed to hold the auxiliary valve 90. In consequence, the number of indispensable parts increases, and the overall length of the pressure control valve also increases. However, the valve can be reduced in general size.

Figure 2:
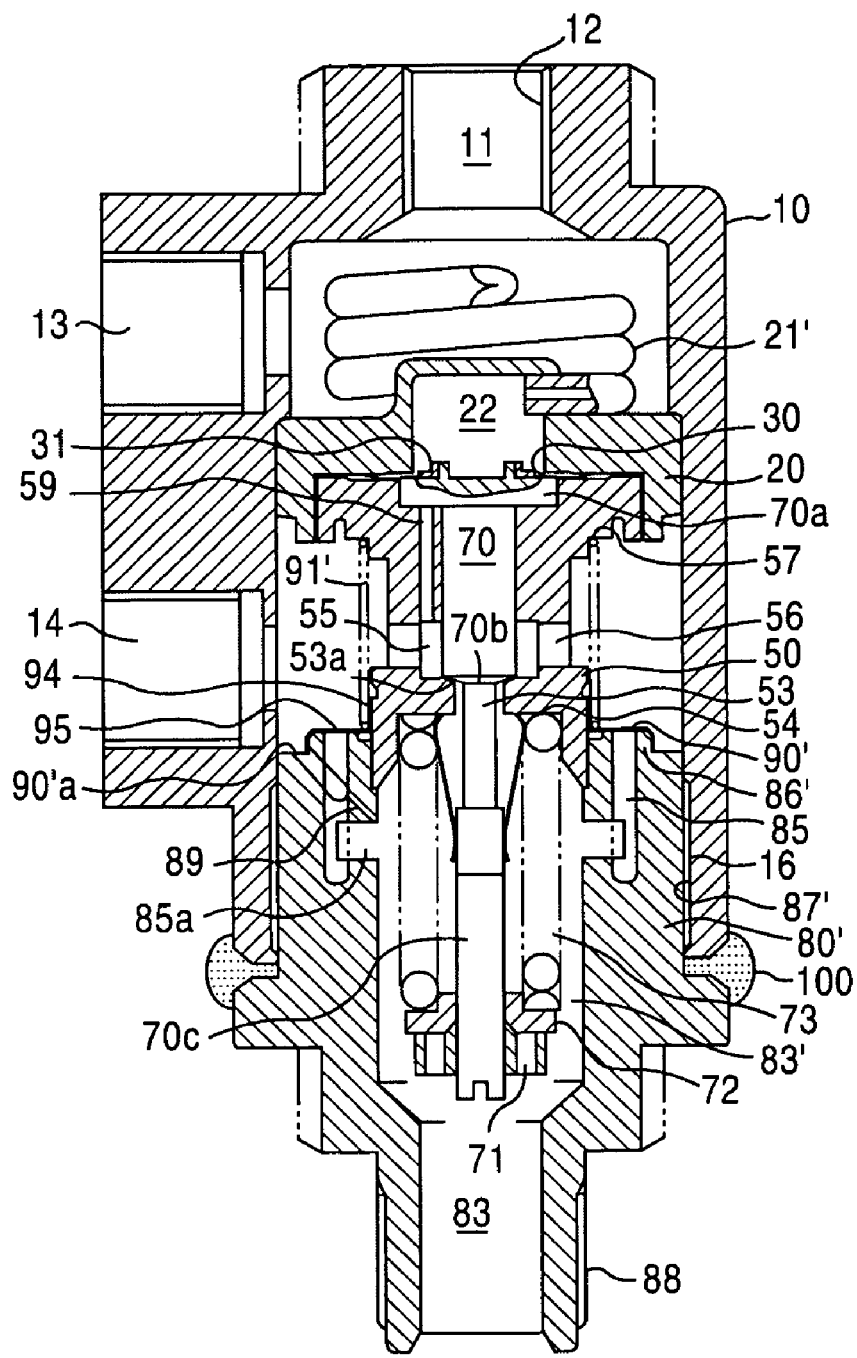
FIG. 2 is a longitudinal sectional view of a pressure control valve according to a second embodiment of the invention.

A second embodiment of the pressure control valve of the present invention will now be described with reference to FIG. 2. The valve of the second embodiment is more compact than the valve of the first embodiment. The pressure control valves of the first and second embodiments are constructed basically in the same manner, having the first inlet 11, internal thread portion 12, outlet 13, second inlet 14, and internal thread portion 16 that are formed in the inlet-side case 10.

A capillary tube 21' that is attached to a temperature sensor lid 20 in the inlet-side case 10 is longer than that of the first embodiment. A closed space 22 that is formed in the temperature sensor lid 20 shares its construction with that of the first embodiment. In the second embodiment, the tube 21' is lengthened so that the sealing effect of a sealed portion can be improved when the distal end of the capillary tube 21' filled with carbon dioxide is sealed by cold welding. Further, the tube 21' is fixed to the side face of a cylindrical portion of the temperature sensor lid 20 by brazing. In consequence, the capillary tube 21' is wound around the cylindrical portion of the lid 20, so that the long tube 21' can be held even in a narrow space with good room in the axial direction of the inlet-side case 10.

As in the case of the first embodiment, a diaphragm 30 is attached to a reinforcing plate 31. Further, the temperature sensor lid 20 is fixed in the inlet-side case 10 in a manner such that it is supported by means of a valve guard body 50 when an outlet-side case 80' (mentioned later) is coupled to the lower part of the inlet-side case 10 by means of an internal thread portion 16.

The pressure control valve of the present embodiment is provided with no single member that is equivalent to the receiving frame 40 of the first embodiment.

The valve guard body 50 is supported from below by means of the outlet-side case 80' that is coupled to the lower part of the inlet-side case 10 by means of the internal thread portion 16. A main valve 70 for control is located in the central portion of the valve guard body 50. A plurality of communication holes 56 are formed in the vertically middle part of the valve guard body 50. A valve hole 53 is formed in the center of the lower part of the valve guard body 50, and a valve seat 53a is formed on the peripheral portion of the inlet of the hole 53. The valve hole 53 communicates with a main valve chamber 55 that is formed in the center of the valve guard body 50.

Further, the valve guard body 50 is formed having an inlet hole 59 through which a fluid pressure from the communication holes 56 acts on a pressure receiving surface of the lower part of the diaphragm 30. A spring bearing portion 54 of a main valve-closing spring 73 is formed in that region of the lower surface of the valve guard body 50 which surrounds the valve hole 53. Furthermore, an auxiliary-valve spring bearing portion 57 is formed on the upper part of the valve guard body 50.

The pressure control valve of the second embodiment is provided with no single member that is equivalent to the housing 60 of the first embodiment.

The main valve 70 for control of the second embodiment is constructed basically in the same manner as that of the first embodiment. More specifically, the main valve 70 is an integral component that has the shape of a column as a whole and comprises a main valve head portion 70a provided with the diaphragm 30, a valve portion 70b that touches and leaves the valve seat 53a of the valve guard body 50 for valve operation, and a valve column portion 70c at the lower part. A spring bearing 72 is mounted on the main valve 70 through an adjust screw 71 that is attached to the lower part of the valve column portion 70c. The main valve-closing spring 73 is located between the spring bearing 72 and the spring bearing portion 54 that is formed on the valve guard body 50. The spring 73 serves to press the main valve 70 downward, thereby causing the valve portion 70b to engage the valve seat 53a (or to close the valve).

In the present embodiment, the outlet-side case 80' has the shape of a cylinder as a whole, and the valve guard body 50 is coupled to the central portion of its upper part. The outer periphery of the case 80' is formed having a external thread portion 87' that mates with the internal thread portion 16 of the inlet-side case 10. A spring chamber 83' is formed in the middle part of the outlet-side case 80'. A main passage 83 is formed in the lower part of the case 80'.

A passage groove portion 85a is formed like a ring on the sidewalls of the outlet-side case 80' that define the spring chamber 83'. The groove portion 85a communicates with the respective lower ends of a plurality of auxiliary-valve working holes 85 that are formed in the outlet-side case 80'. The respective upper ends of the working holes 85 communicate with the second inlet 14. Further, the case 80' is formed having a bleed port 89 that connects the spring chamber 83' and the inlet 14.

An auxiliary-valve seat 86' is formed on the upper surface of the outlet-side case 80'. It is a ring that surrounds the valve guard body 50. An upper opening of each auxiliary-valve working hole 85 can be closed by placing a non-return auxiliary valve 90' on the valve seat 86'. On the other hand, a thread portion 88 is formed on the outer periphery of the lower part of the outlet-side case 80'.

After the outlet-side case 80' is screwed the inlet-side case 10, these cases are coupled to each other by welding. For this welding, a groove is formed in the mating area between the inlet-side case 10 and the outlet-side case 80'. The resulting weld is denoted by numeral 100 in FIG. 2.

Figure 3:
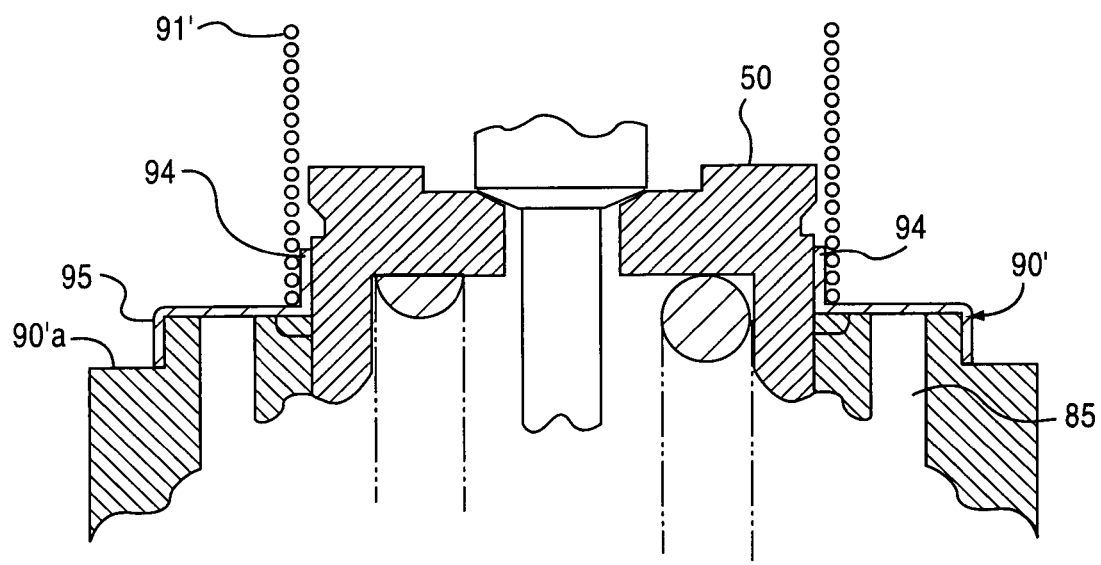
FIG. 3 is a partial enlarged view of a non-return auxiliary valve shown in FIG. 2.

As best shown in FIG. 3, the non-return auxiliary valve 90' is located around the main valve 70 for control so as to be coaxial with the valve 70. The auxiliary valve 90' is composed of a cylindrical portion 94 and an annular rib 95. The cylindrical portion 94 is fitted on the valve guard body 50 and can vertically slide on the outer peripheral surface of the body 50. The rib 95 extends outward from the lower end of the cylindrical portion 94. It can engage the auxiliary-valve seat 86' that is formed on the outlet-side case 80'.

An auxiliary valve spring 91' is interposed between the non-return auxiliary valve 90' and the auxiliary-valve spring bearing portion 57 that is formed on the upper part of the valve guard body 50. Normally, the rib 95 of the auxiliary valve 90' is brought into contact with the auxiliary-valve seat 86' by means of the elastic force of the spring 91', thereby closing the auxiliary-valve working hole 85. Instead of forming the bleed port 89 in the outlet-side case 80', a bleed port 90'*a* may be formed in a part (corresponding to the opening of the auxiliary-valve working hole 85) of the auxiliary valve 90'.

The non-return auxiliary valve 90' can be formed by press molding or resin molding and can reduce parts cost. If the auxiliary valve 90' is formed by working a metallic material, its seal surface may be coated or printed with resin or rubber.

The following is a description of the operation of the second embodiment. According to the present embodiment, the temperature sensor operates in the same manner as that of the first embodiment, depending on the temperature of a fluid that flows into the pressure control valve through the first inlet 11 and flows out through the outlet 13.

When the valve portion 70*b* of the main valve 70 for control is not in engagement with the valve seat 53*a* (or when the valve hole 53 is not closed), the fluid that is introduced again into the main valve chamber 55 through the second inlet 14 of the pressure control valve gets into the spring chamber 83' through the valve hole 53. Then, the fluid flows out from the main passage 83. As this is done, the valve hole 53 is opened and closed for pressure control by means of the main valve 70 for control. Thus, the fluid that flows into the first inlet 11 is a fluid that is pressure-controlled according to the fluid temperature.

While the fluid enters through the second inlet 14 and flows out from the main passage 83, as described above, the rib 95 of the non-return auxiliary valve 90' closes the auxiliary-valve working hole 85 by means of the pressure of the fluid that acts on the rib 95 in contact with the auxiliary-valve seat 86' and the spring load of the auxiliary valve spring 91'.

If the flow of the fluid is then changed so that the fluid flows back from the outlet-side case 80' toward the second inlet 14, the fluid that passes through the passage groove portion 85*a* and flows in through the auxiliary-valve working hole 85 pushes the non-return auxiliary valve 90' open by means of its pressure, passes through the working hole 85, and flows out through the second inlet 14. As this is done, the valve portion 70*b* of the main valve 70 for control is closed by means of the main valve-closing spring 73, so that the fluid cannot pass through the valve hole 53.

The pressure control valve of the second embodiment described above can be made smaller than that of the first embodiment in general size. According to the first embodiment, the non-return auxiliary valve 90 is located under the main valve 70 for control, so that the housing 60 is needed to hold the auxiliary valve 90 between the inlet-side case 10 and the outlet-side case 80'. In consequence, the number of indispensable parts increases, and the overall length of the pressure control valve also increases, so that the valve is large-sized inevitably. According to the second embodiment, on the other hand, the non-return auxiliary valve 90' and the auxiliary valve spring 91' are located around the main valve 70 for control so as to be coaxial with the valve 70, so that the housing 60 that is required by the first embodiment is omitted. Thus, the pressure control valve of the second embodiment can be made smaller in size and lighter in weight than that of the first embodiment, its manufacturing cost can be lowered further.

Since the non-return auxiliary valve 90' of the second embodiment can be formed by press molding or resin molding, its manufacturing cost can be lowered. If the auxiliary valve 90' is formed by working a metallic material, its seal surface may be coated or printed with resin or rubber. According to the first embodiment, moreover, the auxiliary-valve seat 86 of the non-return auxiliary valve 90 is formed on the outlet-side case 80 by cutting. According to the second embodiment, on the other hand, the auxiliary-valve seat 86' of the non-return auxiliary valve 90' must only be formed on the upper surface of the outlet-side case 80' in the shape of a ring that surrounds the valve guard body 50. Thus, the valve seat 86' can be worked relatively easily, so that its cost can be lowered.

According to the first embodiment, the receiving frame 40 and the valve guard body 50 are manufactured separately and screwed to each other, so that the number of indispensable parts and the necessary man-hour increase inevitably. Possibly, moreover, dimensional errors may be caused when the receiving frame 40 and the valve guard body 50 are combined together. According to the second embodiment, on the other hand, the valve guard body 50 also has the function of the receiving frame 40, so that the receiving frame 40 need not be used separately. Thus, the second embodiment, unlike the first embodiment, is not subject to the problem of dimensional errors that are caused when the receiving frame 40 and the valve guard body 50 are combined, so that a high-accuracy pressure control valve can be provided.

According to the first embodiment, the outer periphery of the temperature sensor lid 20 is sealed by means of the O-ring 33. Therefore, the lid 20 must be formed having a groove for the O-ring 33, and the O-ring 33 to be fitted in the groove is required separately.

According to the first embodiment, moreover, the valve guard body 50 and the housing 60 are internally sealed by being screwed to each other. Therefore, an external thread and an internal thread must be formed on the valve guard body 50 and the housing 60, respectively. Since the sealing properties must be secured by controlling the clamping torque, the manufacturing cost is high.

According to the second embodiment, on the other hand, metal seals are used for sealing between the temperature sensor lid 20 and the inlet-side case 10 and between the valve guard body 50 and the outlet-side case 80'. Further, screw clamping torque with which the inlet-side case 10 and the outlet-side case 80' are screwed to each other is converted into abutting load on each metal seal, whereby the metal seal surface is fixed. Thus, the temperature sensor lid 20 need not be provided with any groove for the O-ring, and the O-ring 33 can be omitted. Furthermore, the valve guard body 50 and the outlet-side case 80' need not be threaded for connection, so that the cost can be lowered.

According to the first embodiment, moreover, the O-rings 61 and 82 are used for sealing, so that gas transmission through the O-ring members may possibly cause a slow leakage to the outside. According to the second embodiment, on the other hand, the inlet-side case 10 and the outlet-side case 80' are sealed in a manner such that the respective outer peripheries of their screwed portions are grooved and welded together after they are screwed to each other. Thus, the O-rings and their corresponding grooves can be omitted, so that the cost can be lowered. Since welding is used for sealing, moreover, a leakage to the outside can be reduced to zero.

According to the second embodiment, furthermore, the bleed port 89 is formed in the outlet-side case 80', so that it can be worked with ease. Accordingly, air setting operation can be adjusted with use of a dedicated jig for an internal assembly (assembly of the temperature sensor lid 20, valve guard body 50, diaphragm 30, main valve 70 for control, etc.) only, so that the operation can be performed speedily or efficiently without any outflow from the bleed port 89. The same effect can be obtained if the bleed port 89 of the outlet-side case 80' is replaced with the bleed port 90'*a* of the auxiliary valve 90'.

According to the second embodiment, moreover, carbon dioxide is sealed in the elongated capillary tube 21', and the distal end of the tube 21' is sealed by cold welding, whereby the sealing effect is improved. Furthermore, the capillary tube 21' can be wound around the cylindrical portion on the upper part of the temperature sensor lid 20 in a manner such that it is fixed to the side face of the cylindrical portion by brazing. Even in a narrow space, therefore, the long tube 21' can be held with good room in the axial direction of the inlet-side case 10.

What is claimed is:

1. A pressure control valve, comprising:
   a main valve for control, capable of opening and closing a valve hole by means of a diaphragm, and controls the pressure of a fluid by the agency of the main valve for control;
   a housing having a base portion at least a part of said main valve for control is housed within the housing; and
   a non-return auxiliary valve for control in the direction of operation thereof, held in the base portion of the housing such that it is located right under the main valve wherein
   when the fluid flows from a second inlet to a main passage, the main valve is opened while the non-return auxiliary valve is closed and when the fluid flows from the main passage to the second inlet, the main valve is closed while the non-return auxiliary valve is opened.

2. A pressure control valve, comprising:
   a main valve for control, capable of opening and closing a valve hole by means of a diaphragm, and controls the pressure of a fluid by the agency of the main valve for control; and
   a non-return auxiliary valve surrounding the main valve for control so as to be coaxial therewith wherein
   when the fluid flows from a second inlet to a main passage, the main valve is opened while the non-return auxiliary valve is closed and when the fluid flows from the main passage to the second inlet, the main valve is closed while the non-return auxiliary valve is opened.

3. The pressure control valve according to claim 2, wherein said non-return auxiliary valve includes a cylindrical portion to be guided by a valve guard body having the valve hole therein and an annular rib extending outward from one end of the cylindrical portion.

4. A pressure control valve which has a main valve for control, capable of opening and closing a valve hole by means of a diaphragm, and controls the pressure of a fluid by the agency of the main valve for control, comprising:
   a non-return auxiliary valve located around the main valve for control so as to be coaxial therewith, wherein said non-return auxiliary valve includes a cylindrical portion to be guided by a valve guard body having the valve hole therein and an annular rib extending outward from one end of the cylindrical portion and wherein said rib can engage an auxiliary-valve seat on an outlet-side case having therein a spring chamber for a main valve-closing spring.

5. The pressure control valve according to claim 4, wherein said outlet-side case is formed having a plurality of auxiliary-valve working holes opening in the auxiliary-valve seat and communicating with the spring chamber for the main valve-closing spring.

6. The pressure control valve according to claim 4 or 5, further comprising a bleed port formed in the rib or between the spring chamber and a refrigerant inlet in an inlet-side case.

* * * * *